(12) United States Patent
Ford (10) Patent No.: US 10,342,226 B1
(45) Date of Patent: Jul. 9, 2019

(54) HEEL COUNTER FOR REDUCING BREAKOVER SHIFT

(71) Applicant: Garrett N. Ford, Durango, CO (US)

(72) Inventor: Garrett N. Ford, Durango, CO (US)

(73) Assignee: EASYCARE, INC., Tucson, AZ (US)

( * ) Notice: Subject to any disclaimer, the term of this patent is extended or adjusted under 35 U.S.C. 154(b) by 137 days.

(21) Appl. No.: 15/171,162

(22) Filed: Jun. 2, 2016

Related U.S. Application Data (60) Provisional application No. 62/169,728, filed on Jun. 2, 2015.

(51) Int. Cl.
   *A01K 13/00* (2006.01)
   *A01L 3/02* (2006.01)

(52) U.S. Cl.
   CPC .............. *A01L 3/02* (2013.01); *A01K 13/007* (2013.01)

(58) Field of Classification Search
   CPC ........... A01K 13/007; A01L 3/02; A43B 3/28; A43B 3/30
   USPC ................ 54/82; 36/111, 112; 119/814, 850; D30/146, 147
   See application file for complete search history.

(56) References Cited

U.S. PATENT DOCUMENTS

| | | | | |
|---|---|---|---|---|
| 275,872 | A | * | 4/1883 | Taylor ........................ A01L 1/00 168/25 |
| 840,892 | A | * | 1/1907 | Adam ........................ A01L 7/04 168/1 |
| 5,224,549 | A | * | 7/1993 | Lightner .................... A01L 5/00 168/18 |
| 6,305,328 | B1 | * | 10/2001 | Marquis ............... A01K 13/007 119/850 |
| 7,032,367 | B1 | * | 4/2006 | Yoho .................... A01K 13/007 54/82 |
| 8,186,447 | B2 | * | 5/2012 | Osborne .............. A01K 13/007 168/20 |
| 8,664,466 | B2 | * | 3/2014 | Tilghman ................. A61D 9/00 119/850 |

FOREIGN PATENT DOCUMENTS

CA        2344916 A1 *  3/2000  ........... A01K 13/007

* cited by examiner

*Primary Examiner* — Peter M Poon
*Assistant Examiner* — Danielle A Clerkley
(74) *Attorney, Agent, or Firm* — Antonio R. Durando (57) ABSTRACT

A heel counter inserted in a horse boot connects the heel of the hoof to the front of the upper of the boot with straps folded and secured over the upper. As a result, the hoof cannot slide backward as it moves within the boot during use, thereby avoiding breakover shift. Hook and loop fasteners are used to secure wrapping sections of the upper to each other and the heel counter straps to the wrapping sections.

6 Claims, 15 Drawing Sheets

HEEL COUNTER FOR REDUCING BREAKOVER SHIFT

RELATED APPLICATIONS

This application is based on and claims the priority of provisional application Ser. No. 62/169,728 filed Jun. 2, 2015, hereby incorporated by reference.

BACKGROUND OF THE INVENTION

Field of the Invention

The invention relates in general to boots for horses and, in particular, to a boot that includes a heel counter designed to prevent the forward shift of the breakover line of the boot during use.

Description of the Prior Art

Horse boots are used to protect the hooves and fetlocks of horses and are often used in lieu of horseshoes. A horse boot typically includes a sole with a flat top surface that covers the underside of the hoof and an upper that projects upward from the sole and forms an enclosure for the hoof of the horse. The upper typically extends along at least a portion of the rim of the sole and has a bottom edge secured to the sole. A tongue is often formed in the front portion of the upper.

Figure 1:
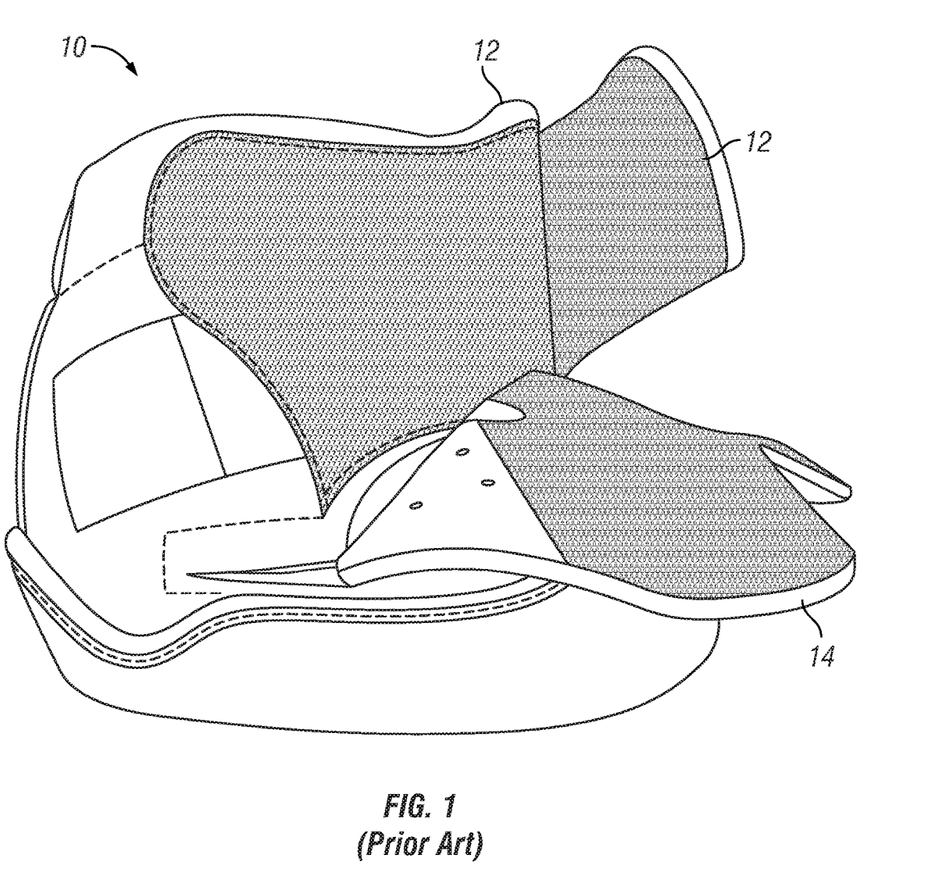
FIG. 1 is a perspective view of a conventional horse boot of the type to which the heel counter of the invention is directed showing an open tongue-like front portion and two lateral wrapping sections.
Figure 2:
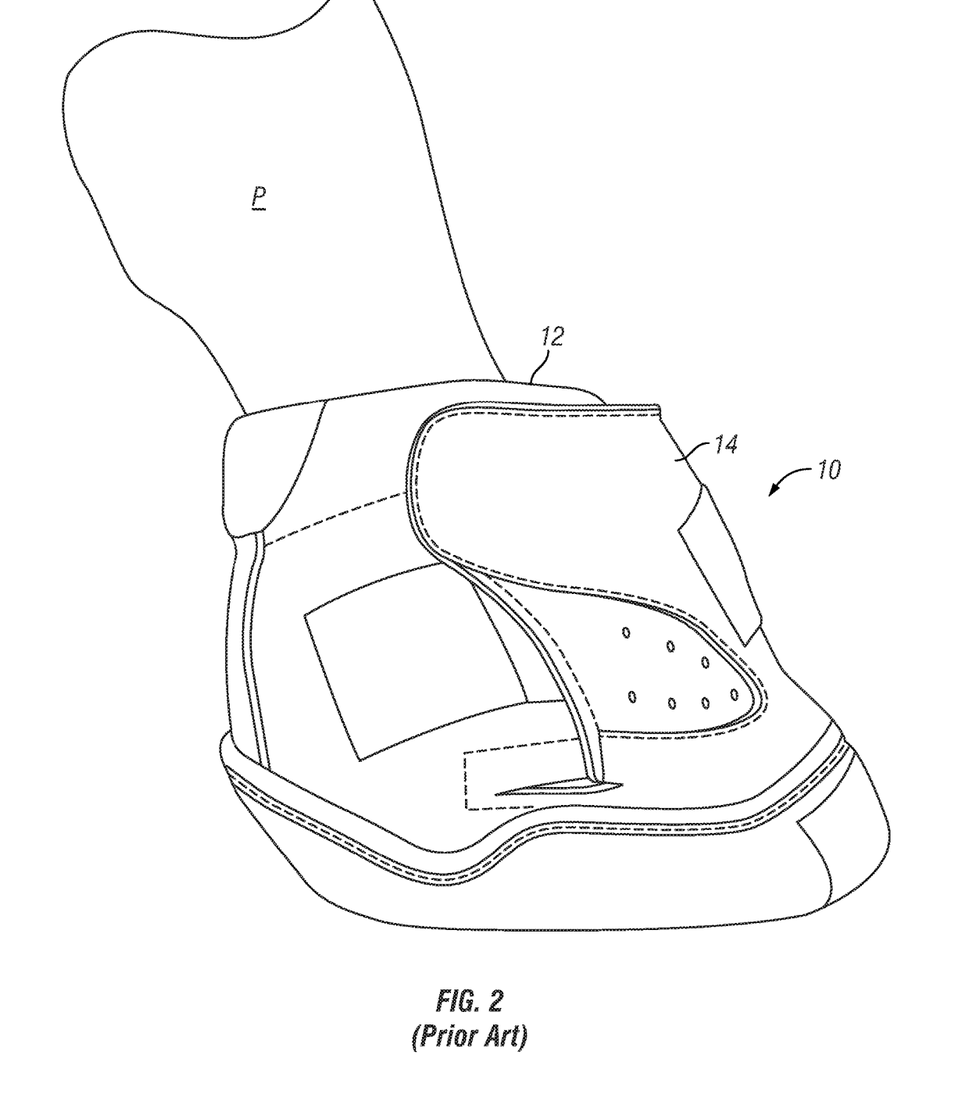
FIG. 2 is a perspective view of the horse boot of FIG. 1 mounted on a model hoof.

In a particular type of horse boot with an upper made of soft leather or fabric material, the heel portion of the upper extends upward by an amount (three to four inches) sufficient to form an enclosure that envelops and supports the heel of the hoof. As illustrated in a conventional such boot 10 of FIG. 1, the rear side portions of the upper extend forward from the heel to form two lateral wrapping sections 12 that are folded over the hairline and around the pastern P at the front of the hoof and tightened to hold the upper firmly against the hoof. A tongue-like front portion 14 of the boot is configured to extend up from the toe portion of the boot so as to cover and be connected to the overlapping wrapping sections of the upper, such that the hoof is completely enclosed in a tight boot configuration, as illustrated in FIG. 2.

In use, such a boot is installed by spreading open the wrapping sections 12 of the upper and the front portion 14, slipping the boot onto the hoof from the front, folding the two lateral wrapping sections of the upper around the front of the pastern, and securing the tongue-like front portion 14 over them to completely enclose the hoof. The wrapping sections and the front portion of the upper are preferably secured in place by the use of hook and loop connections.

This type of boot provides good hoof protection and its relatively soft upper allows some of the desirable hoof expansion that is associated with the pumping action of the frog when the hoof repeatedly presses on the ground. As such, the boot is often used as an alternative to traditional metal horseshoes.

However, the breakover point of the hoof wearing this boot is unavoidably extended forward by the sole thickness and the extended tip of the boot, which is an undesirable feature that can affect horse performance and/or cause injury.

The breakover time is defined in the art as the moment when the heel of the front hoof lifts off the ground during the stride. The breakover point is the line across the toe of the hoof over which the hoof tilts as it breaks over. The position of the breakover point is crucial to the length of the stride and the way the hoof lands on the ground, all of which affect the natural movement of the front legs of the horse. In the horse's natural state, the breakover line coincides exactly with the tip of the hoof. Therefore, the ideal position of the breakover line remains at the tip of the hoof also when a boot is worn, but the presence of the sole and its extended tip necessary shift the breakover line forward, which is undesirable. In addition, the moment the horse takes steps, the hoof tends to rotate inside the boot lifting the heel slightly with respect to the sole and commensurately retracting the toe of the hoof from the tip of the boot, which further extends the breakover line forward with respect to the hoof's toe.

Furthermore, given the relative elasticity of the material used for this type of boot, the hoof tends to migrate toward the back of the boot with movement and stay there, which obviously also shifts the breakover line forward. In the prior art, this problem has been addressed by fitting the boot very, very tightly, which renders the process of applying the boot more difficult and does not solve entirely the rotation problem mentioned above. The present invention is directed at providing a solution to these problems.

SUMMARY OF THE INVENTION

The invention is an interior heel counter, placed between the rear of the upper and the hoof, that connects tightly the heel of the hoof to the front of the upper of the boot. As a result, the hoof cannot slide backward as it moves within the boot during use. Because of the quasi-integral connection between the hoof and the front portions of the upper provided by the heel counter, the hoof remains tied to the front portion of the upper and in a fixed structural relation to the tip of the boot. Therefore, the toe of the hoof cannot slide back in relation to the tip of the boot.

Inasmuch as the purpose of the heel counter is to tie the hoof to the front of the boot (rather than providing a support layer for the heel of the hoof), the counter comprises a heel cup with two lateral straps used to pull the counter and the hoof's heel toward the front of the upper and to secure them in that forward position. To that end, each of the wrapping sections of the upper is provided with a slit for passing a respective counter strap from the interior to the exterior of the upper, through the wrapping sections, such that the heel counter straps can be tightened and secured in place over the fastened wrapping sections. The tongue-like front portion of the upper can then be secured over them in conventional manner to provide enclosure and further support to the connection between the heel counter and the upper. Hook and loop strips and pads are used to secure the wrapping sections to each other, the heel counter straps to the wrapping sections and to each other, and the front portion of the upper to the wrapping sections and the overlapping straps.

The resulting effect is a boot where the position of the heel of the hoof is tied to the tip of the boot by means of its tight connection to the front of the upper, which in turn is integral with the tip of the boot. As the hoof rotates within the boot during use, the heel remains in substantially unchanged position with respect to the tip of the boot even when moving upward in relation to the rear portion of the upper. As such, the heel counter of the invention greatly reduces the breakover shift normally caused by the rotation of the hoof in this type of boot.

Various other advantages will become clear from the description of the invention in the specification that follows and from the novel features particularly pointed out in the appended claims. Therefore, this invention includes the features hereinafter illustrated in the drawings, fully described in the detailed description of the preferred embodiments and particularly pointed out in the claims, but such drawings and description disclose only some of the various ways in which the invention may be practiced.

DETAILED DESCRIPTION OF THE PREFERRED EMBODIMENT

As used herein, the term "sole" is defined to refer only to that part of a horse boot that covers entirely the underside of the hoof of a horse. By contrast, the term "horseshoe" is defined to refer to a structure, made of any material, substantially in the form of a conventional horseshoe with an open heel and an interior open area corresponding substantially to the interior underside of the hoof of a horse. The term "tongue-like" front portion is used throughout to refer to a portion of the upper of the boot fitted with the heel-counter of the invention. Such structure resembles a boot tongue because it extends up and backward from the toe of the boot, and it is sufficiently wide to cover the front and be attached to the wrapping sections of the boot.

Figure 3:
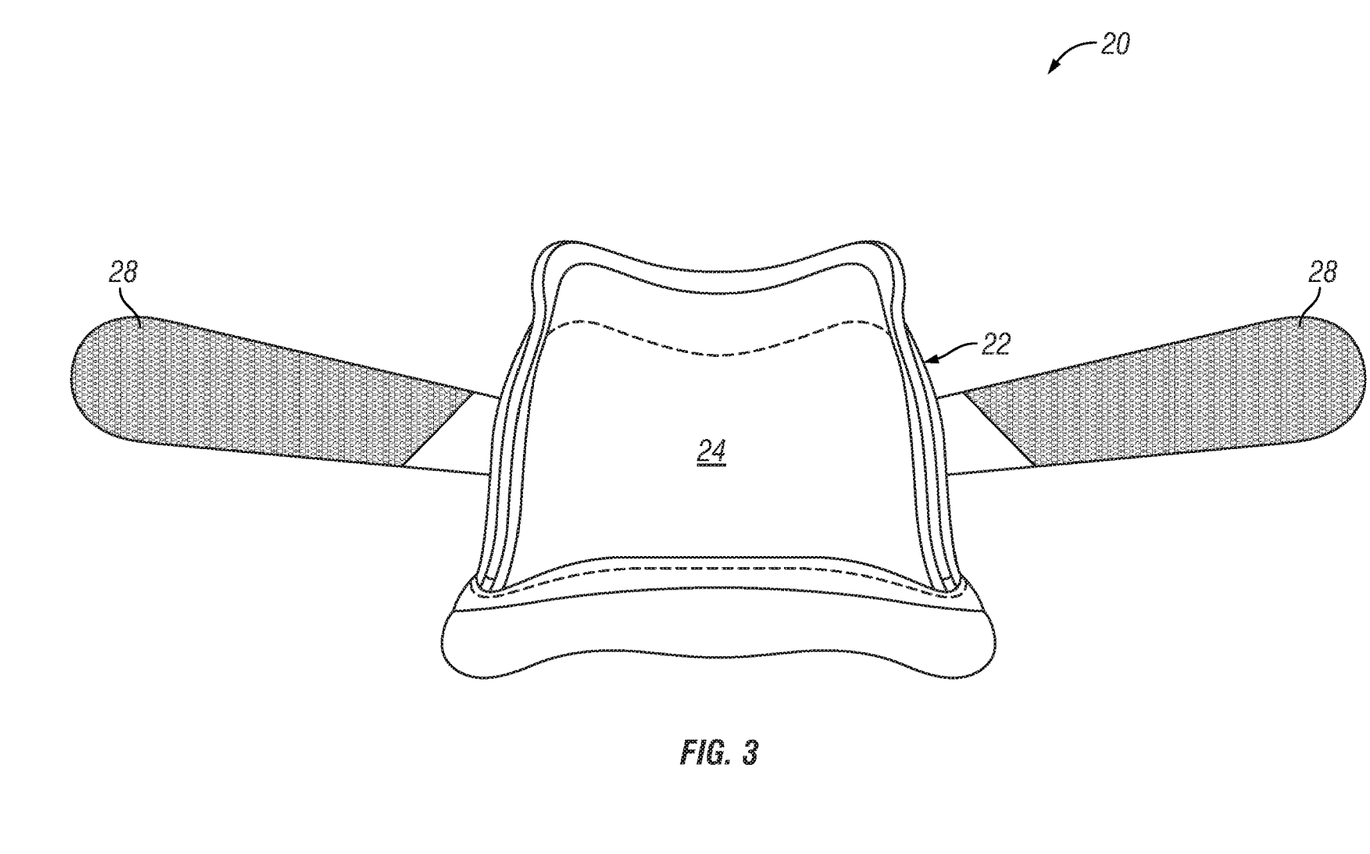
FIG. 3 is perspective front view of a heel counter according to the invention.
Figure 4:
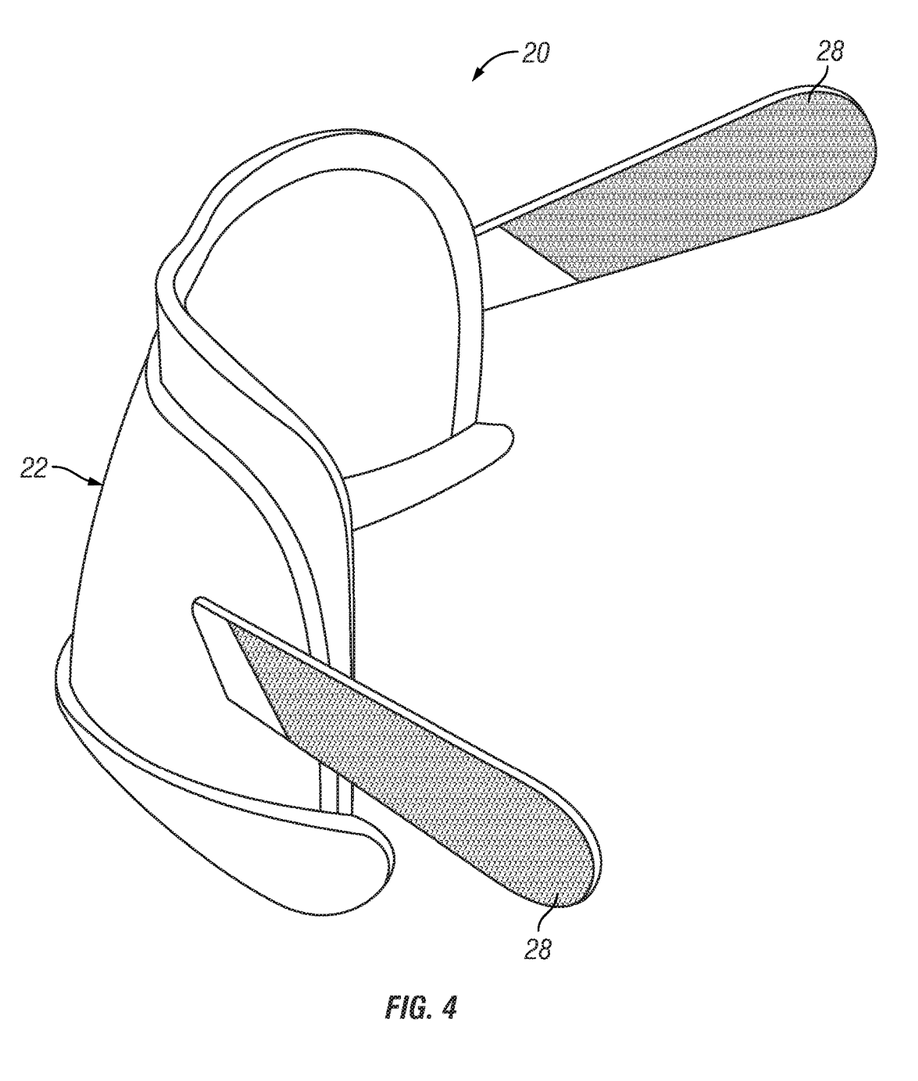
FIG. 4 is a perspective right-side view of the heel counter of FIG. 3.
Figure 5:
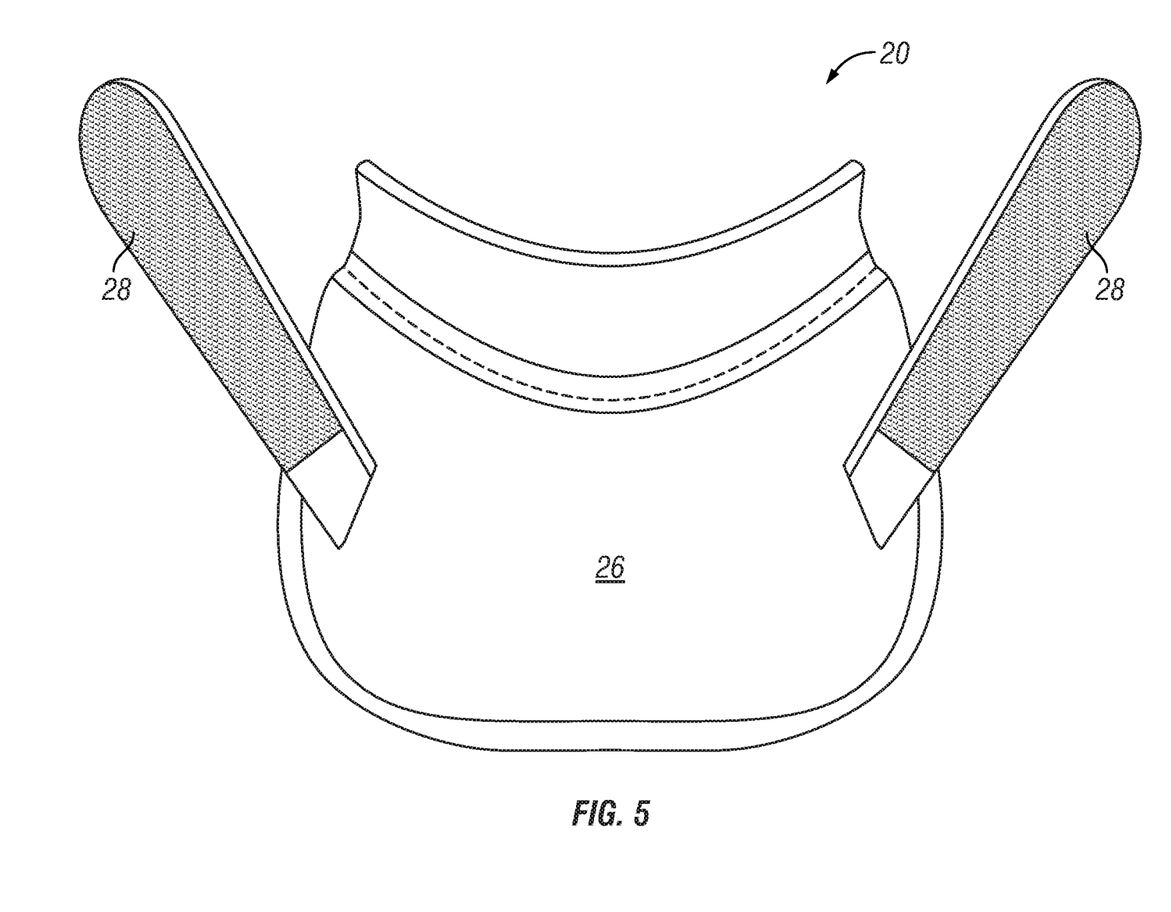
FIG. 5 is a perspective rear view of the heel counter of FIG. 3.

Referring to FIGS. 3-5, a heel counter 20 according to the invention is illustrated. The heel counter consists essentially of a cup-like structure 22 with an inner front surface 24 designed to conform to the heel of the hoof and an outer rear surface 26 designed to conform to the interior surface of the upper at the back of the boot for which it is intended, thereby providing a suitable insert accessory for the boot. The heel counter 20 includes two lateral straps 28 projecting forward from the midsection of the structure 22, intended for passing through appropriately positioned slits in the wrapping sections of the boot receiving the heel counter, so that the straps 20 can be secured over the closed wrapping sections 12 of the boot (see FIG. 1) around the front of the hoof at about the hairline area in order to tighten and keep the counter firmly connected to the heel of the hoof. Strips of hook and loop material (illustrated throughout the figures by shaded areas), or equivalent fastening devices, are provided in the straps to secure them in place after closing the wrapping sections 12 over the hoof of the horse and tightening of the counter 20 against the heel of the hoof.

Figure 6:
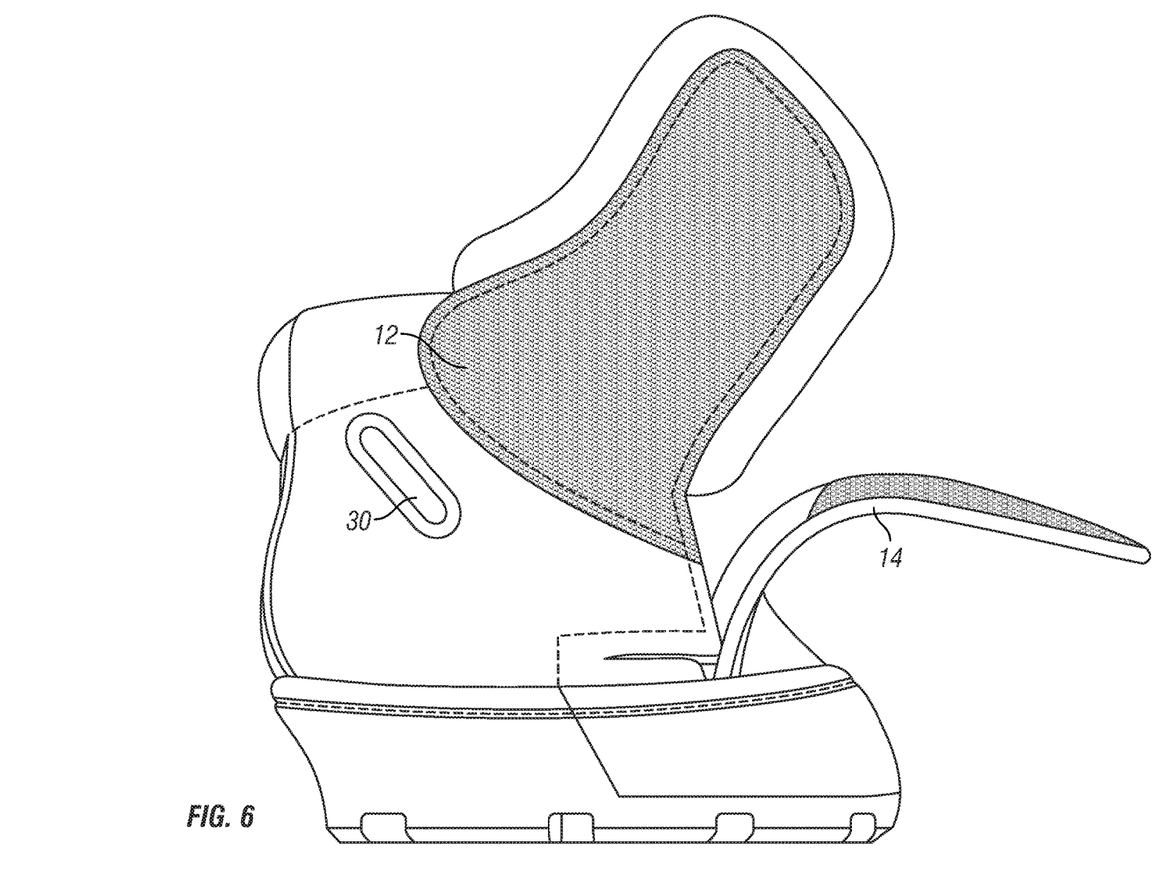
FIG. 6 shows the exterior of the wrapping sections of the exemplary conventional boot of FIG. 1 including the slits formed for accommodating the straps of the heel counter according to the invention.
Figure 7:
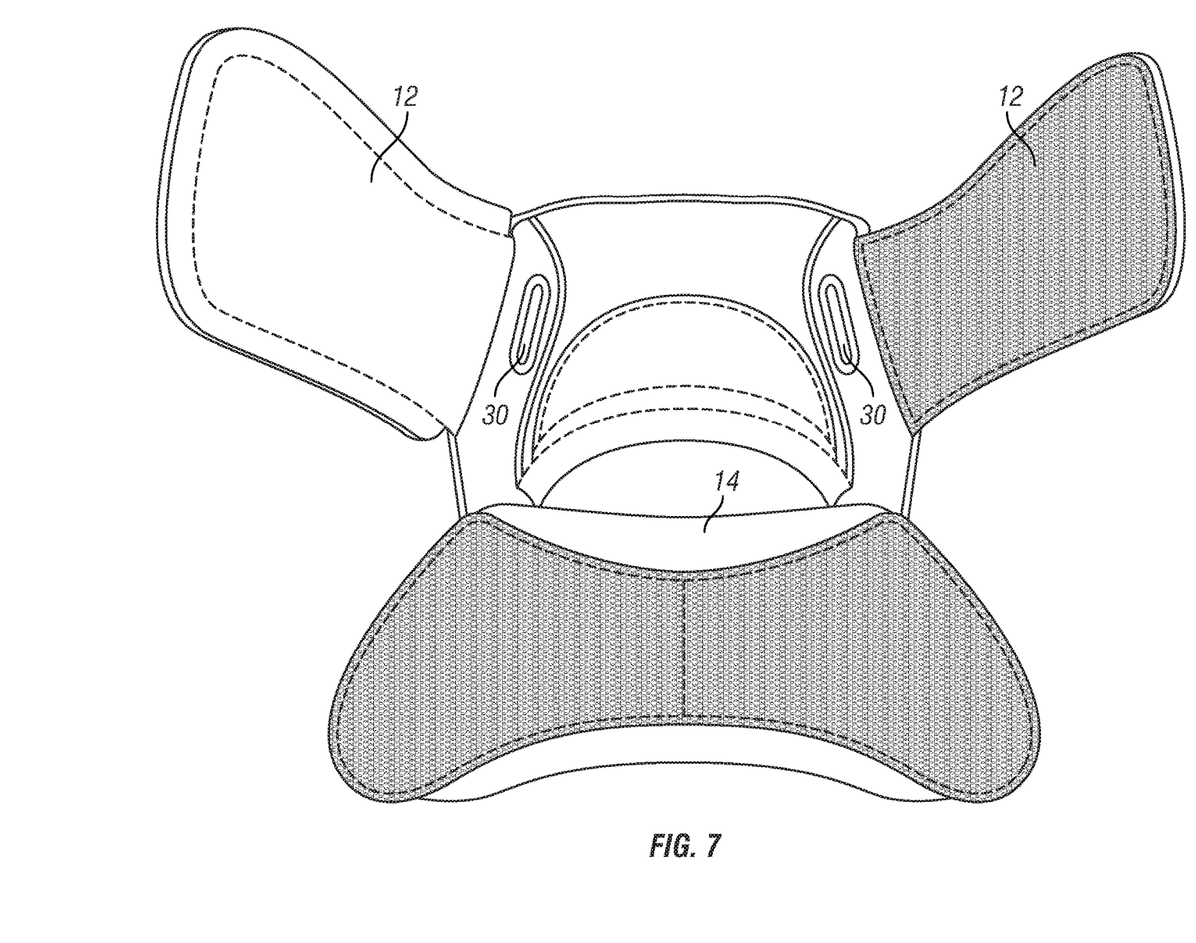
FIG. 7 shows the interior of the wrapping sections of the boot of FIG. 1 including the slits for accommodating the straps of the heel counter.
Figure 8:
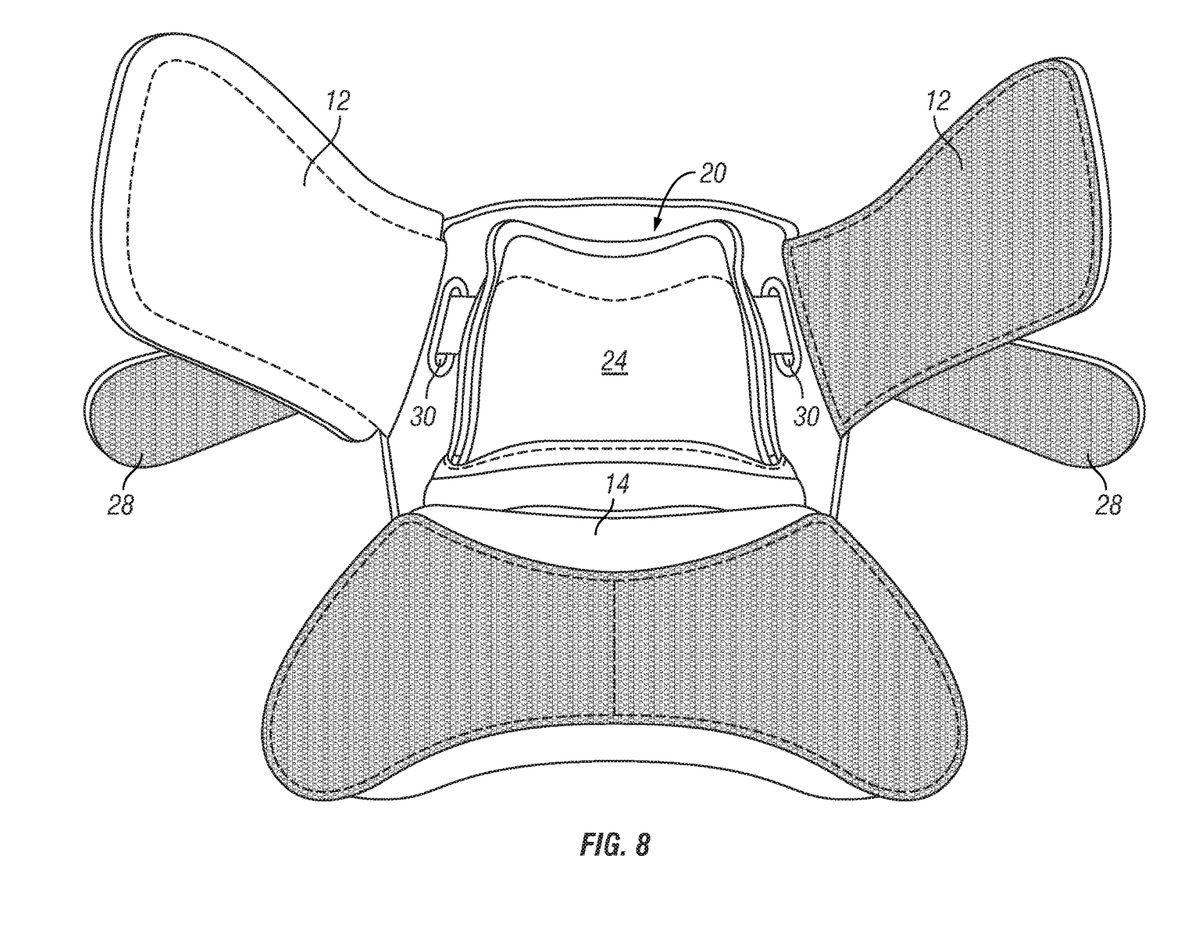
FIG. 8 shows the heel counter installed in the boot with the straps threaded through the slits of the wrapping sections from inside the upper of the boot.
Figure 9:
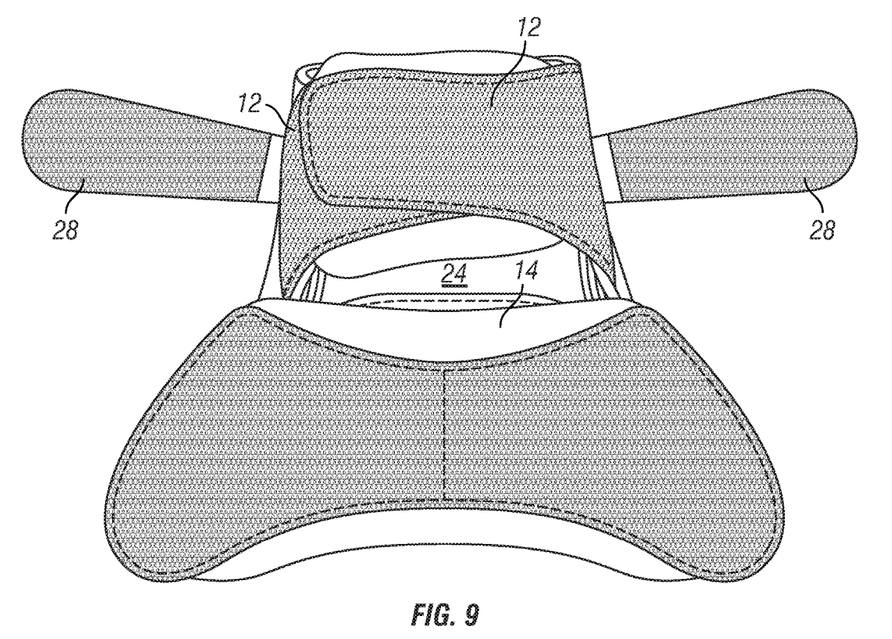
FIG. 9 shows the straps of the heel counter emerging from the slits of the wrapping sections outside the upper of the boot.
Figure 10:
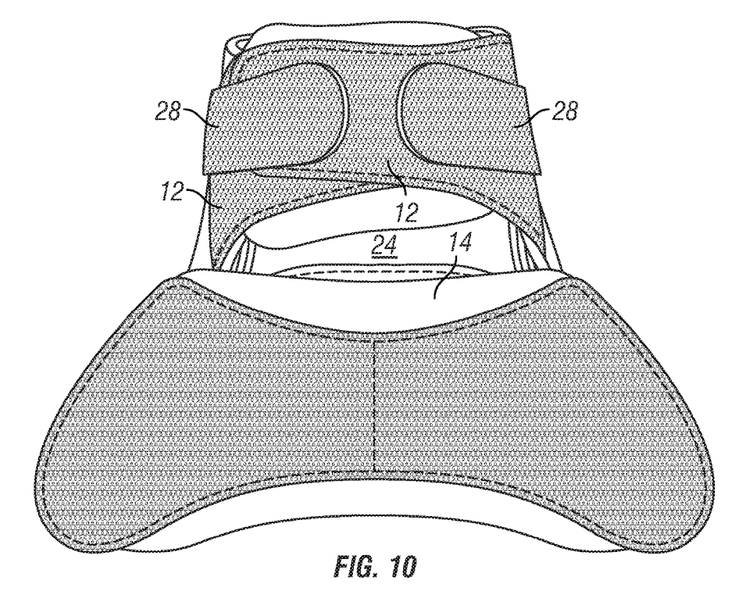
FIG. 10 shows the straps of the heel counter wrapped over and secured to the wrapping sections of the boot.

As shown in FIGS. 6 and 7, the conventional boot of FIG. 1 used for illustrating the invention is modified to accommodate the heel counter 20 as a boot insert capable of minimizing breakover shift according to the invention. (Note that the open front portion 14 of the boot overlaps and hides the tip of the boot in FIGS. 7-10.) An opening or slit 30 (illustrated reinforced by a grommet) adapted to receive a respective strap of the heel counter is formed in each wrapping section 12 of the boot 10 to allow the straps 28 to be threaded from the interior, as shown in FIG. 8, and emerge on the exterior of the wrapping sections 12 toward the front of the boot, as illustrated in FIG. 9. After closing the wrapping sections 12 in conventional manner around the front of the hoof, the straps 38 can in turn be secured over them, as shown in FIG. 10.

Figure 11:
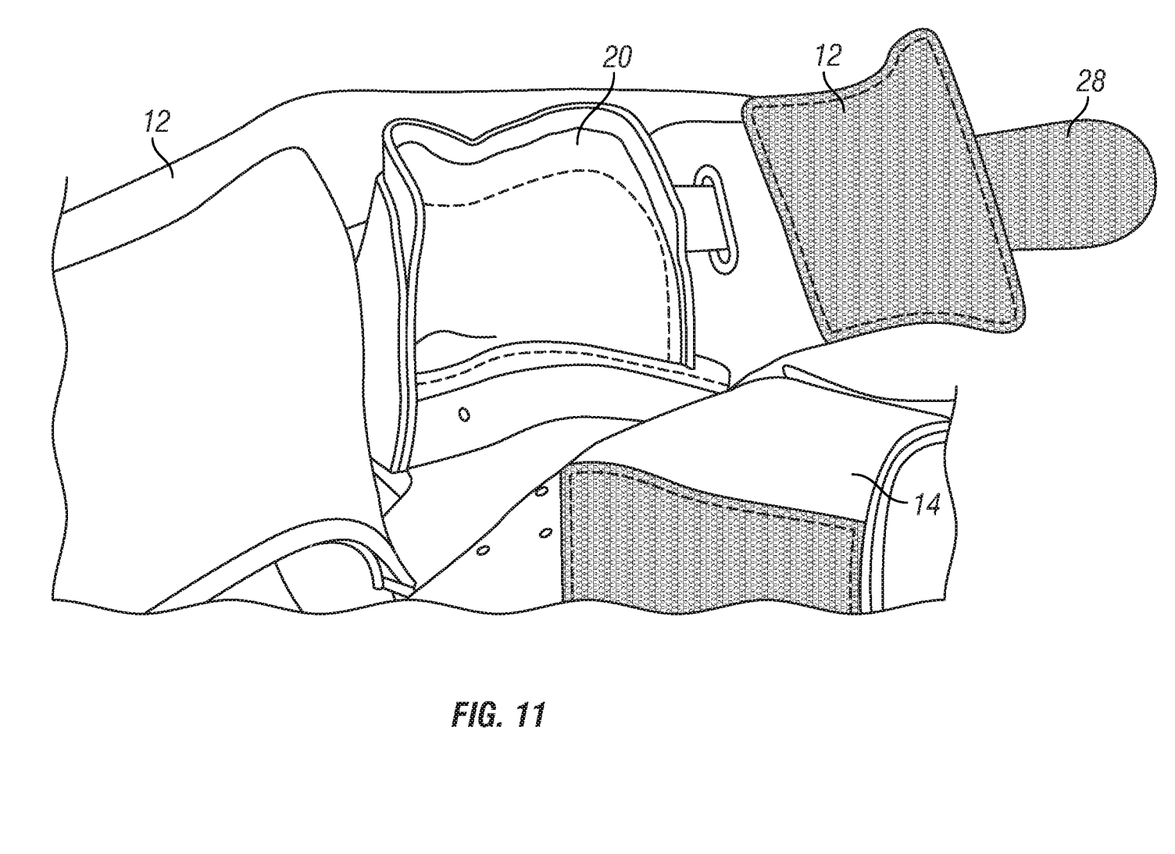
FIG. 11 shows the heel counter inserted into the upper of the boot with the straps threaded through the slits of the wrapping sections, ready for use.
Figure 12:
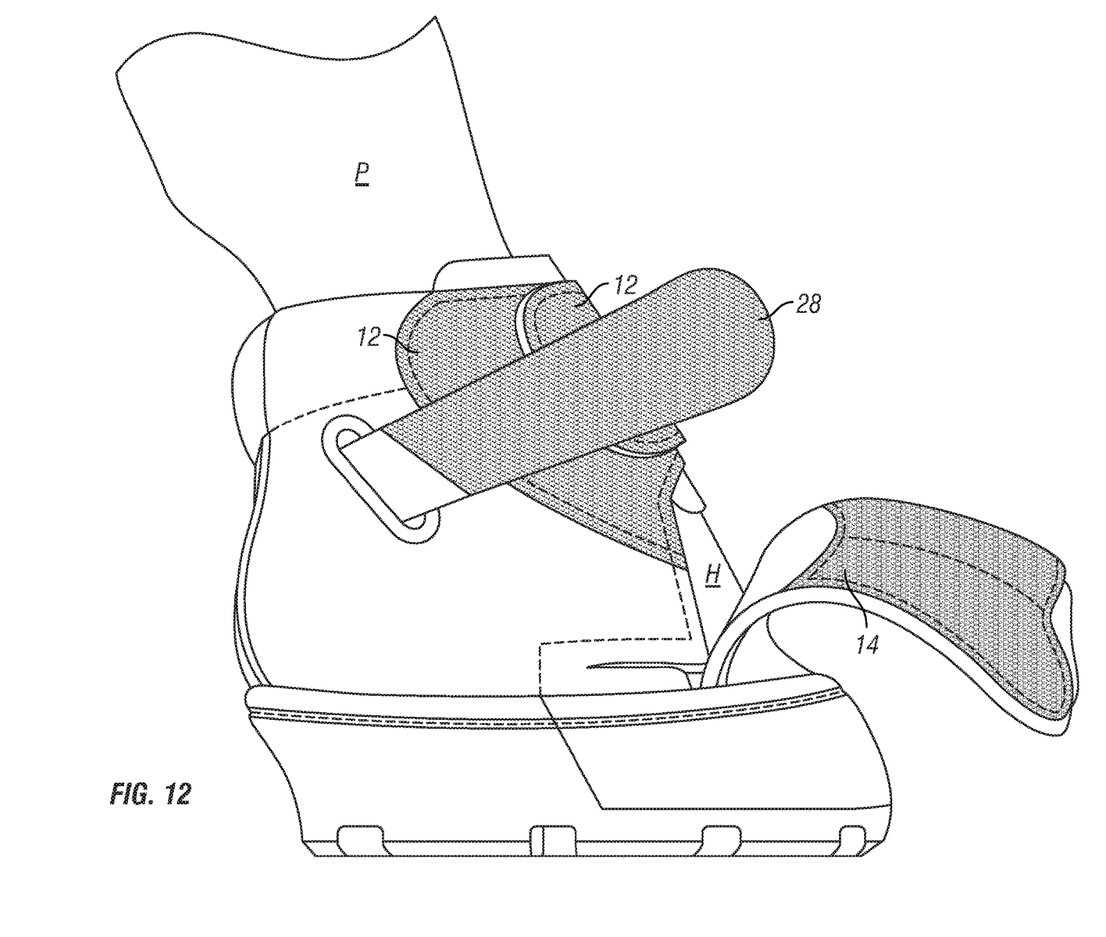
FIG. 12 shows the boot after the wrapping sections are enclosed around the hoof with the straps of the heel counter still untied.
Figure 13:
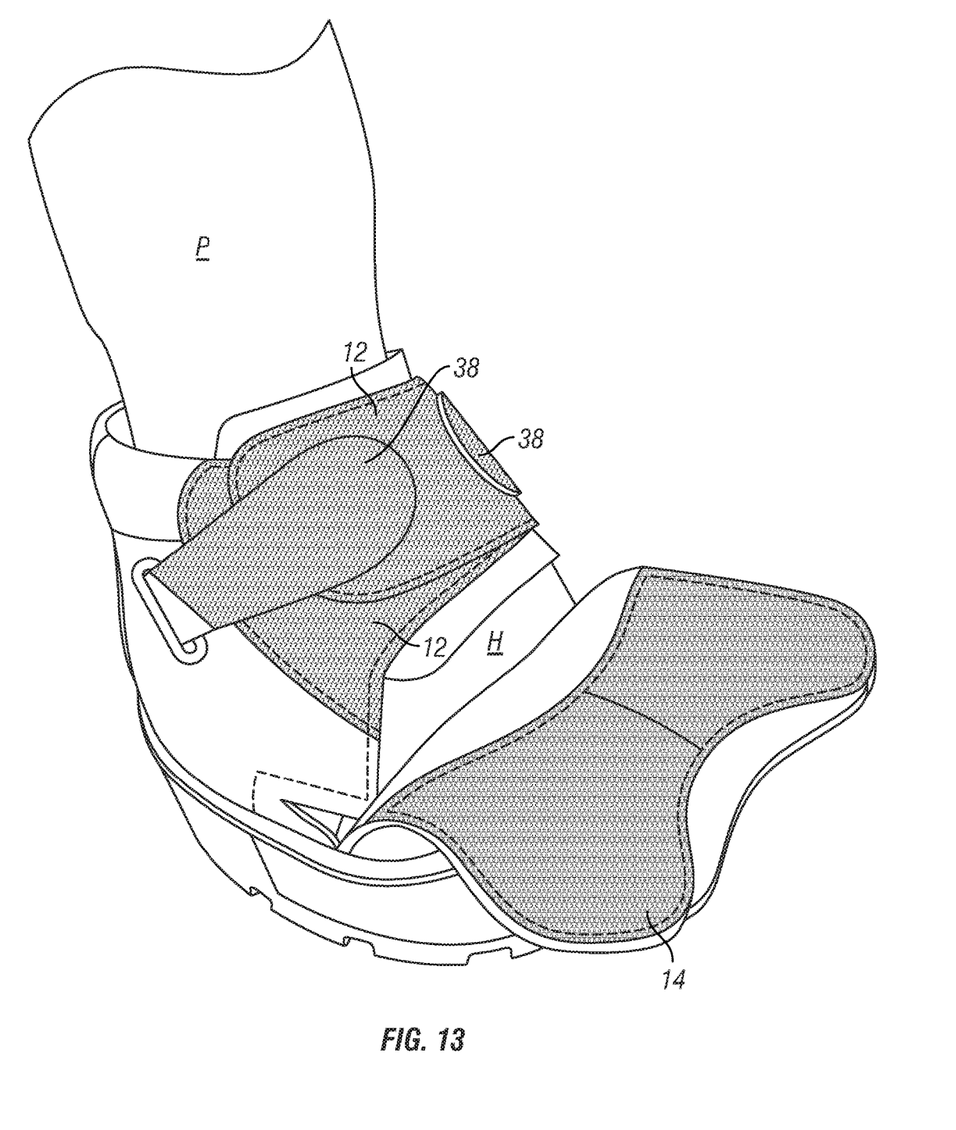
FIGS. 13-15 show the boot after the straps are pulled to tighten the connection of the heel counter to the heel of the hoof and tied to the upper of the boot.
Figure 14:
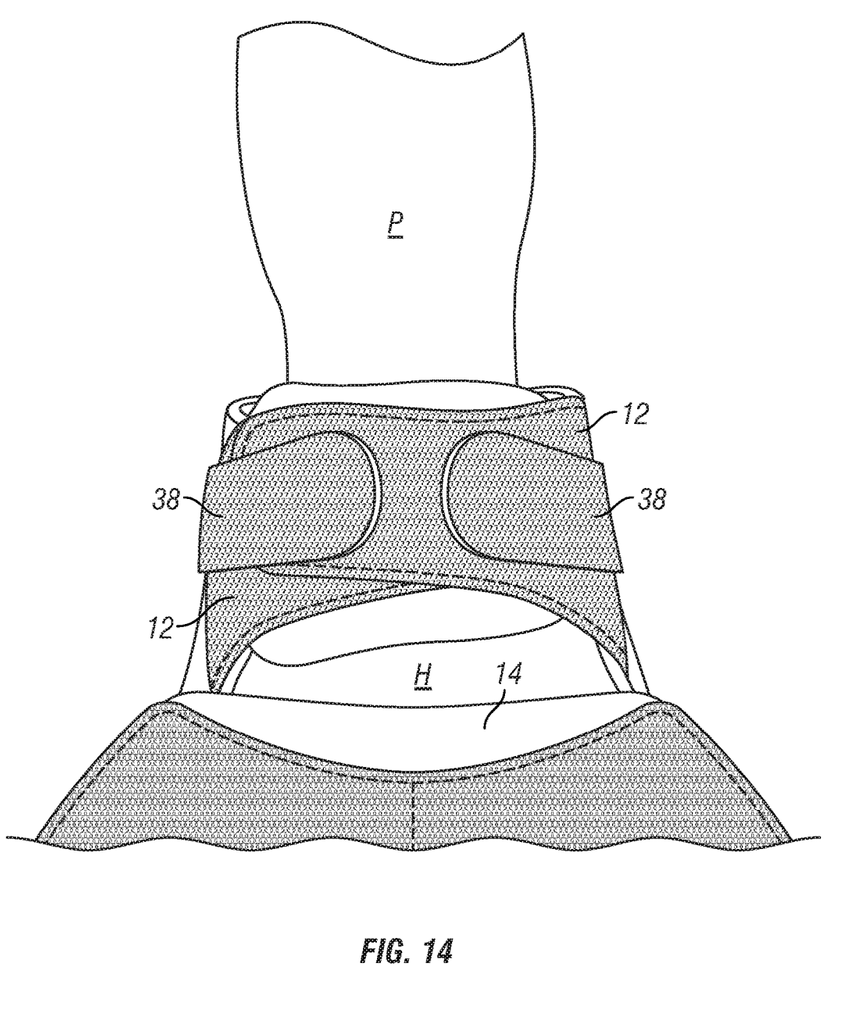
Figure 15:
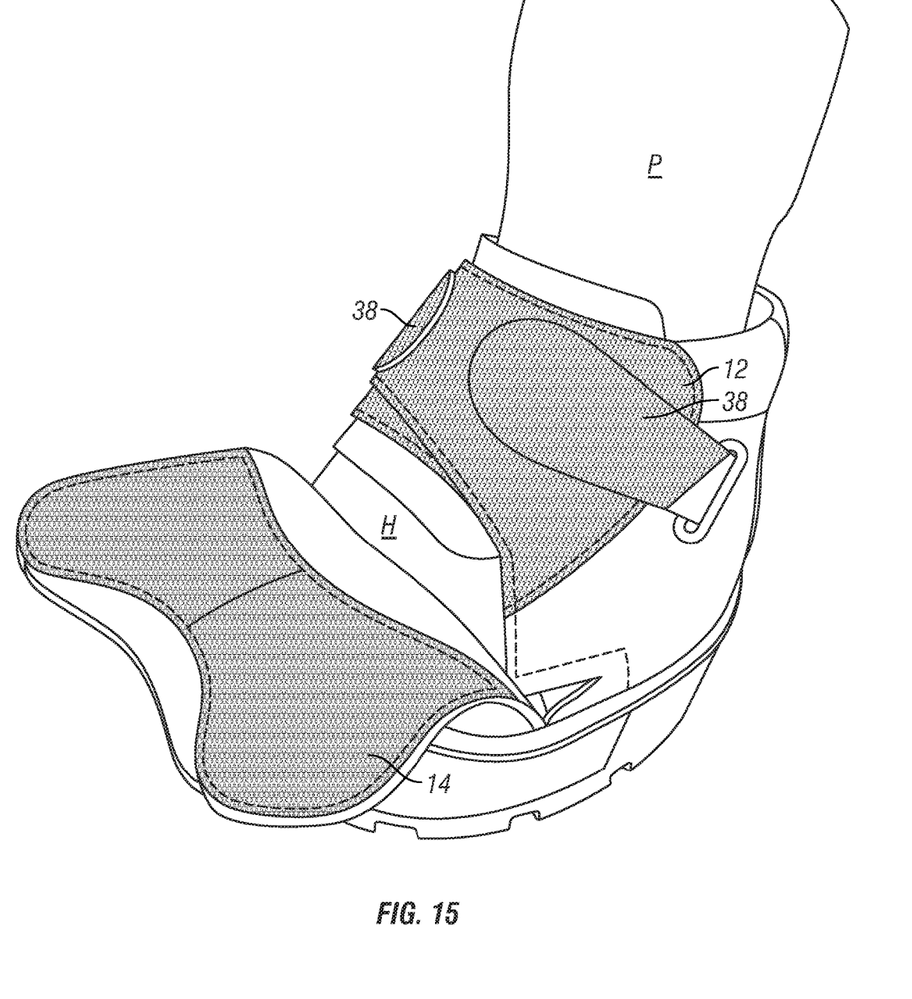
Figure 16:
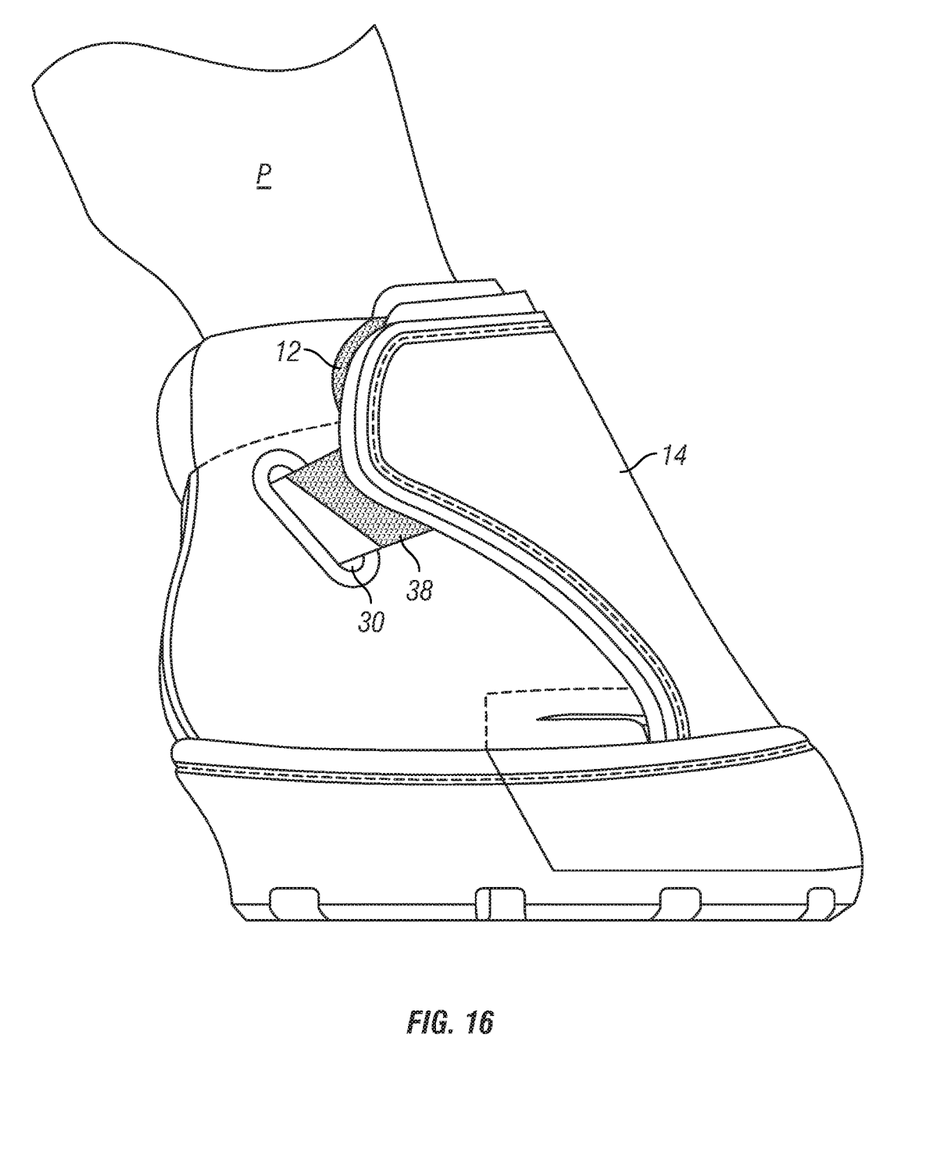
FIG. 16 shows the boot after the front portion of the upper is folded over the wrapping sections of the upper and the straps of the heel counter to complete the installation of the boot.

Thus, in use, the boot is installed as described above with reference to FIG. 1; that is, after placing the heel cup 20 in place, as shown in partially cut-out FIG. 11, the boot is installed by spreading open the wrapping sections 12 and the front portion 14 of the upper, and slipping the boot onto the hoof from the front. The two lateral wrapping sections 12 of the boot are then folded over and around the hairline at the front of the hoof H and tightened to hold the upper firmly against the hoof, as shown in FIG. 12. As illustrated, at this stage of the process the straps 28 of the heel counter remain loose protruding from the wrapping sections 12 on each front side of the hoof. The straps are then pulled forward to tighten the heel counter against the hoof and secure it in place over the wrapping sections of the boot, as seen in FIGS. 13, 14 (partially cut out) and 15. The connection between the straps 28 of the heel counter 20 and the upper of the boot (through the wrapping sections 12) ensures that the hoof is kept forward in relation to the boot as it may rotate during use, thereby retaining substantially the original position of the breakover line. Hook and loop strips are also preferably used to fasten the straps 28 of the counter to the exterior surfaces of the wrapping sections 12. Finally, the tongue-like front portion 14 of the upper is folded backward over the straps and wrapping sections and fastened to them, preferably also by hook and loop fasteners, to completely enclose the hoof as shown in FIG. 16.

The cup-like structure 22 of the heel counter of the invention is preferably made of resilient but hard material, such as polyurethane, capable of withstanding the pressures exerted by the motion of the hoof during use. The counter has been described as a stand-alone insert but is could also be incorporated into the structure of the boot by attaching it to the interior of the upper with flexible material that would allow the counter to move forward when pulled by the straps during installation and during any rotation of the heel during use.

Thus, a heel counter has been disclosed for reducing the breakover shift caused by hoof rotation during use of horse boots. The modified boot also does not require the very tight fit previously used to avoid the backward shifting of the hoof with movement; therefore, it is easier to install and results in a snug fit that ensures a stable position of the hoof during use.

While the invention has been shown and described herein with reference to what are believed to be the most practical embodiments, it is recognized that departures can be made within the scope of the invention. For example, the conventional boot 10 used to illustrate the invention features two wrapping sections 12 extending forward from each rear side of the boot, each with an opening 30 for passing the straps 28 from the interior to the exterior of the wrapping sections. However, it is clear that the heel counter 20 of the invention could be used as well with a boot having a single wrapping section extending forward from only one side of the boot and long enough to reach and be connected to the other side at the back of the boot. In such a configuration, the single wrapping section would include two slits adapted to receive the straps of the heel counter.

Similarly, the straps 28 are illustrated for convenience with a width approximately equal to the openings 30 through which the straps are passed for assembling the boot of the invention. However, it is anticipated that the distal ends of the straps may be substantially wider than shown in order to provide a larger contact area for hook-and-loop fastening to the wrapping sections. During assembly, such larger straps would be inserted backward into the slits 30 and then attached to the cup-like structure 22. It is also anticipated that the interior portions of the straps 28, which are shown exposed for convenience of description in FIGS. 8 and 11, may be covered by flexible material spanning from the structure 22 to the interior of the wrapping sections on both sides of the heel counter. In view of these exemplary departures from the detailed description, the invention is not to be limited to the details disclosed herein but is to be accorded the full scope of equivalent articles.

I claim:

1. A horse boot comprising:
   a sole;
   an upper and with a wrapping structure extending forward from a rear portion of the upper, said wrapping structure having two opposite lateral sides and being adapted for wrapping around a pastern of a horse and holding the upper firmly against a hoof of the horse, said wrapping structure including a slit on each of said two opposite lateral sides thereof;
   a cup-like structure with a right side and a left side and configured to conformably receive a heel of the hoof, said cup-like structure being interior to said rear portion of the upper;
   a strap protruding forward from each of said right side and left side of the cup-like structure through said slit in the wrapping structure and adapted for connection thereto so as to fasten the cup-like structure to the upper of the horse boot; and
   a tongue-like front portion of the upper extending backward from a toe portion of the boot so as to cover and be connected to the wrapping structure of the upper.

2. The horse boot of claim 1, wherein said wrapping structure and each of said strap include hook and loop material for securing the wrapping structure to the pastern and for fastening the cup-like structure to the upper of the horse boot.

3. The horse boot of claim 1, wherein said wrapping structure includes two wrapping sections extending forward, one from each side of said rear portion of the boot, and each of said wrapping sections includes hook and loop material for securing the wrapping sections around the pastern of the horse and for fastening the heel counter to the wrapping sections of the horse boot.

4. A method for reducing breakover shift during use of a horse boot, comprising the following steps:
   providing a boot that includes an upper with a wrapping structure for folding over a pastern and holding the upper firmly against a hoof of a horse;
   providing a cup-like structure in an inner rear portion of the boot configured to conformably receive a heel of the hoof, the cup-like structure including straps protruding forward through openings in said wrapping structure;
   installing the boot on the hoof through an opening at a front portion of the boot;
   folding and securing the wrapping structure over the pastern;
   tightening and securing the straps over the wrapping structure; and
   securely covering said opening at the front portion of the boot.

5. The method of claim 4, wherein said tightening and securing steps are carried out with hook and loop material.

6. The method of claim 4, wherein said upper further includes a tongue-like front portion extending backward from a toe portion of the boot, the installing step is carried out by folding forward said tongue-like front portion of the upper to create said opening, and the covering step is carried out by folding backward and securely fastening the tongue-like front portion of the upper over the wrapping structure and the straps.

* * * * *